United States Patent [19]

Klein et al.

[11] 4,404,120

[45] Sep. 13, 1983

[54] PROCESS FOR PREPARING HYDROXY-CONTAINING AMINE COMPLEXES WHICH ARE USEFUL AS CATALYSTS FOR TRIMERIZING ISOCYANATES AND PREPARING POLYURETHANES

[75] Inventors: Howard P. Klein, Houston; George P. Speranza, Austin, both of Tex.

[73] Assignee: Texaco Inc., White Plains, N.Y.

[21] Appl. No.: 336,138

[22] Filed: Dec. 31, 1981

[51] Int. Cl.$^3$ .............................................. C08G 18/18
[52] U.S. Cl. ..................................... 252/426; 521/118
[58] Field of Search ......................................... 252/426

[56] References Cited

U.S. PATENT DOCUMENTS

| | | | |
|---|---|---|---|
| 2,779,689 | 1/1957 | Reis | 521/78 |
| 2,981,700 | 4/1961 | Parker et al. | 521/129 |
| 3,297,597 | 1/1967 | Edwards et al. | 521/166 |
| 3,892,687 | 7/1975 | Bechara et al. | 252/426 |

Primary Examiner—Maurice J. Welsh
Attorney, Agent, or Firm—Jack H. Park; Kenneth R. Priem; David Mossman

[57] ABSTRACT

Hydroxy-containing amine complexes useful as catalysts for the trimerization of isocyanates and the preparation of urethanes from alcohols and isocyanates, are prepared in good yield by reacting an amine with an epoxide in the presence of water and an aldehyde having no alpha protons, and then recovering the desired complex from the reaction mixture. Also provided are new rigid polyurethane cellular products having a high content of isocyanurate linkages, superior heat distortion temperatures and insulating properties which are obtained by reacting a polyol with a polyisocyanate in the presence of the aforementioned new amine complex catalysts.

13 Claims, No Drawings

PROCESS FOR PREPARING HYDROXY-CONTAINING AMINE COMPLEXES WHICH ARE USEFUL AS CATALYSTS FOR TRIMERIZING ISOCYANATES AND PREPARING POLYURETHANES

BACKGROUND OF THE INVENTION

1. Field of the Invention

This invention relates to a new process for preparing amine complexes. More particularly, the invention relates to a new process for preparing hydroxy-containing amine complexes which are useful as catalysts for trimerizing isocyanates and preparing polyurethanes.

Specifically, the invention provides a new process for preparing hydroxy-containing amine complexes which are particularly useful as catalysts for reactions involving isocyanates, such as the trimerization of isocyanates to isocyanurates and the preparation of urethanes from alcohols and isocyanates, which new catalysts are prepared by reacting an amine with an epoxide, such as ethylene oxide, in the presence of water and an aldehyde having no alpha protons, and then recovering the desired amine complex from the reaction mixture. The invention further provides new and valuable polyurethanes, and particularly new rigid polyurethane cellular products having a high content of isocyanurate linkages, superior heat distortion temperatures and improved insulating properties, which products are prepared by reacting a polyol with a polyisocyanate in the presence of the aforementioned new amine complex catalysts.

2. Description of the Prior Art

Isocyanate groups react with hydroxyl groups at significant rates when the mixture is heated. However, the reaction can be accelerated by the addition of appropriate catalysts. The dimerization or trimerization of isocyanates to isocyanurate ring linkages can also be accelerated by the addition of catalysts.

Numerous catalysts have been suggested for the above-noted reactions. Amine catalysts have been used for promoting the polyurethane polymerization reactions: see Polyurethanes-Chemistry and Technology, Vol. 1 (1962), pages 138 to 180. Quaternary ammonium compounds have also been proposed as catalysts for the formation of polyurethane resins from polyols and polyisocyanates (U.S. Pat. Nos. 2,779,689 and U.S. 2,981,700). U.S. 3,297,597 discloses the use of amine complexes prepared from Mannich bases as catalysts for rigid polyurethane foam preparation.

While these catalysts are useful in the above-noted reactions, they leave much to be desired in the way of cost and properties of the resulting products, and particularly the rigid cellular products. For example, many of the cellular products have low resistance to heat distortion. Further, many of the products have a distinct amine odor resulting from the amine catalysts employed in the production.

It is an object of the invention, therefore, to provide new hydroxy-containing amine complexes. It is a further object to provide new hydroxy-containing amine complexes which are particularly useful as catalysts for isocyanate reactions. It is a further object to provide a process for making amine complexes which are improved catalysts for the polymerization of isocyanates to isocyanurates. It is a further object to provide a new process for making amine complexes which are improved catalysts for the formation of polyurethanes from polyols and polyisocyanates. It is a further object to provide catalysts for the formation of rigid polyurethane cellular products which imparts good heat resistance and improved insulation properties. It is a further object to provide new catalysts for the preparation of polyurethane cellular products which yields products having unusually high isocyanurate linkages. It is a further object to provide a new process for making amine complex catalysts which is economical and can operate without the use of expensive components such as Mannich bases. These and other objects will be apparent from the following detailed description of the invention.

SUMMARY OF THE INVENTION

It has now been discovered that these and other objects may be accomplished by the hydroxy-containing amine complexes of the present invention which are prepared in good yield by reacting an amine with an epoxide, such as ethylene oxide, in the presence of water and an aldehyde having no alpha protons, such as formaldehyde, and recovering the desired complex from the reaction mixture. It was surprising to find that complexes having superior catalytic properties could be obtained by this straight forward economical process which avoids expensive reactants, such as the Mannich bases, used in prior catalyst preparation processes.

In addition, it was unexpected to find that the use of the above-noted hydroxy-containing amine complexes as catalysts in the reaction of isocyanates gave improved results over many of the prior known catalysts.

It has been found, for example, that the use of the aforementioned amine complexes in the formation of rigid polyurethane foams by the reaction of polyisocyanates with polyhydric alcohols gives products having unusually high content of isocyanurate linkages, high heat distortion temperatures and improved insulating properties. In addition, such products are free of amine odors. The production of such superior results is illustrated in the examples at the end of the specification.

DETAILED DESCRIPTION OF THE INVENTION

The process for producing the new hydroxy-containing amine complexes having the improved catalytic properties is made up of the following steps:

(a) mixing an amine, an epoxide, such as an alkylene oxide, water and an aldehyde having no alpha protons, such as formaldehyde, together in a reaction container and heating the mixture to a temperature below about 90° C., and (b) after the complex has been formed stripping the reaction mixture of water and other low molecular weight components, such as glycol, to yield the desired hydroxy-containing amine complex.

The process for using the above-noted amine complexes as catalysts for isocyanate reactions comprises adding the said complex to the reaction mixture containing an isocyanate and other components, such as polyols, blowing agents, stabilizers, fire-retardants, etc. in the desired stoichiometry proportions.

In order to present the inventive concept of the present invention in the greatest possible detail, the following supplementary disclosure is submitted.

The amines used in the preparation of the new complexes may be any organic or inorganic compound possessing at least one amino nitrogen atom. The amines may be primary, secondary or tertiary and mono or polyamines, including ammonia. Examples of such amines include, among others, triethylamine, benzylamine, dodecylamine, cyclohexylamine, trioctylamine, morpholine, aniline, naphthylamine, dimethylcyclohexylamine, ethylene diamine, N,N,N',N'-tetramethylethylenediamine, N,N,N',N'-tetraethylene diamine, piperazine, N-methylpiperazine, N-ethylpiperazine, 2-methyl-N-methylpiperazine, 2,2'-dipyridyl, purine, 2-aminopyridine, 2-(dimethylamino)pyridine, 1,10-phenanthrolein, methyl-substituted 1,10-phenanthroline, piperidine, 2-methylpiperidine, ethanolamine, diethanolamine, N,N-dimethylglycine, iminodiacetic acid, 2-hydroxypyridine, picolinic acid, methyl-substituted picolinic acid, 2,5-dicarboxypiperazine, ethylenediaminetetracetic acid, N-methylpyridine, N-methylpyrrolidine, 2-amino-2-methyl-1-propanol, N,N-bis(hydroxypropyl)-2-aminoethanol, and the like, and mixtures thereof.

Preferred amines to be used include the aliphatic, cycloaliphatic, heterocyclic and aromatic mono- and poly-primary, secondary and tertiary amines containing up to 20 carbon atoms, and still more preferably the aliphatic and heterocyclic amines containing up to 12 carbon atoms.

Coming under special consideration are the alkanolamines, such as for example, monoethanolamine, diethanolamine, isopropanolamine, bis(2-hydroxypropyl)amine, hydroxyethylmethylamine, N-hydroxyethylpiperzine, N-hydroxybutylamine, N-hydroxyethyl-2,5-dimethylpiperazine, etc.

The epoxide to be used in the process of the invention may be any monoepoxide or polyepoxide, and particularly includes those of the formula

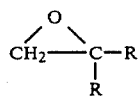

wherein both Rs can be hydrogen or an organic radical, preferably containing up to 12 carbon atoms. Examples of the epoxides include, among others, butadiene monoepoxide, epichlorohydrin, styrene oxide, ethylene oxide, propylene oxide, butylene oxide, cyclohexene oxide, epoxypropylbenzene, epoxypropylnapthalene, 1,2,5-triepoxypropylbenzene, and the like, and mixtures thereof. Particularly preferred are the aliphatic monoepoxides containing 2 to 8 carbon atoms, such as ethylene oxide, propylene oxide, butylene oxide, amylene oxide.

The aldehydes to be used in the process of the invention include those aldehydes which have no alpha protons, i.e., no hydrogen attached to an alpha carbon atom, such as, for example, formaldehyde (and polymerized forms thereof), benzaldehyde, 4-methylbenzaldehyde, 2,2-dibutylpentanal, 2,2-dimethyloctanal, and the like. Formaldehyde and its polymerized forms are particularly preferred reactants to be used in the preparation process. Coming under special consideration are the aldehydes of the formula

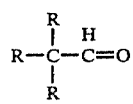

wherein R is an alkyl, cycloalkyl, aryl or alkaryl radical or two R's are joined to form an aromatic or heterocyclic radical.

The above-described reactants can be combined together in the reaction mixture in a variety of proportions. In general, it is useful to combine the amine and the aldehyde in molar proportions varying from about 1.5:1 to 1:1.5. Preferably the amine and aldehyde are combined in approximately equal molar amounts, although higher or lower amounts of either reactant can be utilized.

The amount of the alkylene oxide to be used in the process of the invention may vary over a wide range. In general, the amount of the alkylene oxide may vary from about 1 to 10 times the amount of the amine to be used on a molar basis. Preferably the alkylene oxide is employed in amounts varying from about 2 to 6 moles per mole of the amine to be used in the process.

The water can be added to the reaction mixture separately or in combination with any of the other ingredients. In general, it is added with the aldehyde as in the 37% aqueous formaldehyde. Preferably the water makes up from 10% to 30% by weight of the reaction mixture.

The above-noted reactants can be combined in any order or combined separately before addition to the reaction mixture. For example, it is sometimes desirable to add the amine and aldehyde together before the addition of the alkylene oxide.

Temperatures employed in the process may vary within certain limits. In general, it is desirable to maintain the temperature below about 90° C., and more preferably between 50° C. and 85° C. Atmospheric, superatmospheric or subatmospheric pressures may be utilized as desired or necessary.

The heating is continued until the desired complex has been formed. In general, this is accomplished with reaction periods varying from about 0.5 hours to about 3 hours, depending upon the nature of the reactants and the temperature employed.

At the conclusion of the reaction, the reaction mixture is stripped of water and other low molecular weight products. This may be accomplished by distillation under vacuum such as 5–20 mm/Hg. at 90° C.

The hydroxy-containing amine complex prepared by the above process may be recovered as liquids to soft solids. They are quaternary ammonium products preferably having high hydroxyl numbers, e.g., 400 to 1000, and an amine content of 1 to 6 (meq/g). They are generally water soluble and can be utilized in a great many applications where basic products are utilized. They may be used, for example, as catalysts for epoxides, such as Epon resins, and as catalysts for the preparation of phenolic resins.

As noted above, the products of the invention are particularly suited for use as catalysts for the polymerization of isocyanates, such as the dimerization and trimerization of polyisocyanates, preferably to form rings, and in the reaction of isocyanates with alcohols to form urethanes. They are particularly outstanding as catalysts for the formation of rigid cellular polyurethane products by the reaction of polyisocyanates with polyols in the presence of the usual fire retardants, stabilizers and blowing agents in a suitable mixing device by techniques well known to the art.

The polyisocyanates to be used in making the foams of the present invention include those compounds containing at least two isocyanate groups per molecule, such as, for example, tolylene diisocyanate (TDI), hexamethylenediisocyanurate, chlorophenyldiisocyanurate, bromophenyldiisocyanurate, tetraisocyanatodiphenylmethane, 3,3'-dichloro-4,4'-biphenyldiisocyanate, diphenyl diisocyanate, ethylene diisocyanate, propylene 1,2-diisocyanate, 1,4-tetramethylene diisocyanate, p-phenylene diisocyanate, polymethylene polyphenylisocyanate, and mixtures thereof. Preferred polyisocyanates include the organic aromatic, aliphatic or cycloaliphatic polyisocyanates. Coming under special consideration are the prepolymers obtained by reacting active hydrogen containing compounds, such as alcohols or amines with excess polyisocyanates, which polymers contain a plurality of free isocyanate groups such as from 3 to 8 such groups.

Also of special consideration are the aromatic polyisocyanates such as, for example, 2,4- and 2,6-toluene diisocyanates and methylene-bridged polyphenyl polyisocyanate mixtures which have a functionality of from about 2 to about 4. These latter isocyanates compounds are generally produced by the phosgenation of corresponding methylene-bridged polyphenyl polyamines. Most preferred methylene-bridged polyphenyl polyisocyanates mixtures contain about 20 to 100 weight percent methylene diphenyldiisocyanate isomer, with the remainder being polymethylene polyphenyl polyisocyanates having higher functionality and higher molecular weights. These isocyanate mixtures are known, commercially available, and can be prepared by the process described in U.S. Pat. No. 3,362,979.

The polyols to be used in making the foams of the present invention include those possessing at least two and preferably 2 to 6 hydroxyl groups. Suitable examples include, among others, polyethylene glycol, polypropylene glycol, a linear polyester such as glycol-terphthalate, glycol-succinate, tetramethyleneglycol-adipate or other hydroxy-terminated linear esters. Other polyols may be glycerol, 1,2,6-hexanetriol, 1,3,6-octanetriol, a polyethylene ether derivative of glycerol or 1,2,6-hexanetriol, erythritol, pentaerythritol, mannitol, sorbitol, alpha-methyl glucose and sucrose. Other polyols include those prepared by reacting an alkylene oxide such as ethylene oxide, propylene oxide, 1,2-butylene oxide, styrene oxide, epichlorohydrin, glycidol and mixtures thereof with a polyhydric alcohol such as carbohydrates, glycerol, hexanetriol, petaerythritol, sorbitol, methyl glucoside, sucrose, and the like. In addition, alkylene oxide adducts of certain amines, such as, for example, any of the aforementioned oxides with amines such as ethylene diamine, aminoethylpiperazine, etc. may also be used. Hydroxy-terminated polyesters are also useful in preparing the products of the invention. These include those prepared by reacting dibasic acids such as adipic acid, phthalic acid, terephthalic acid and diols or triols, such as diethylene glycol, glycerol, trimethylpropane and the like.

Preferred polyols to be used include those obtained by reacting alkylene oxides with polyhydric alcohols, the polyols obtained by reacting the alkylene oxides with polyamines and the polyols obtained by reacting polybasic acids with polyhydric alcohols to form hydroxy-terminated products.

The most commonly used foam stabilizers are silicone oils, usually silicone-glycol copolymers such as those prepared in accordance with the disclosure of U.S. Pat. No. 2,834,748. Such materials have the formula:

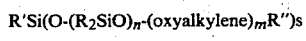

wherein R, R' and R" are alkyl groups containing 1 to 4 carbon atoms, n is 4 to 8, m is 20 to 40, and the oxyalkylene groups are derived from ethylene and propylene oxides or mixtures thereof.

Blowing agents used to prepare rigid urethane foams are generally volatile liquids such as, for example, trichlorofluoromethane.

Fire retardants that can be incorporated in the foaming mixture are of two types, those that are incorporated by mere mechanical mixing and those that become chemically bound in the polymer chains. The most commonly used of the first type are tris(chloroethyl)phosphate, tris(chloropropyl)phosphate, diammonium phosphate, various halogenated compounds and antimony oxide. The second type of fire retardant probably offers the best approach to the problem of fire retarding foams. Examples of this type include chlorendic acid derivatives, terephltratic derivatives, and various phosphorus-containing polyols.

The selection of the reactant components will vary depending upon the type of product desired. In general, when a flexible cellular product is desired, the polyols should preferably have a functionality of from about 2 to 4 and a molecular weight of about 2000 to 6000. For rigid foams, the functionality of the polyol is preferably from about 4 to 8 and a molecular weight of about 300 to about 1200. For polyisocyanurate foams the functionality of the polyol is preferably from about 2 to 8 and a molecular weight of about 105 to 1000.

The proportions of the polyisocyanate, polyol and catalyst to be used in making the polyurethane cellular products of the present invention may vary over a wide range. In general, amounts of the polyisocyanate and polyol may vary considerably depending upon the type of product desired, etc. As noted above, an unexpected advantage of the new catalysts is their ability to bring about the incorporation of much larger amounts of isocyanate linkages in the molecule than generally possible heretofore. The catalyst permits, for example, production of polymers having isocyanate indices varying from about 3.0 to as high as 9.

In making the foams and using the higher molecular weight polyols as the polyesters and polyethers, the proportions should be such that the isocyanate groups are present in at least an equivalent amount, and preferably in excess compared with the free OH groups. Preferably, the ingredients are proportioned so as to provide from 1 to 8 mol equivalents of isocyanate groups per mol equivalent of hydroxyl groups.

As catalysts for the polyurethane reaction, one may employ any one of the above-described new hydroxy-containing amine complexes of the present invention. They may be used alone or in admixture with any of the known catalysts, such as polyamines, tin octoate, dibutyl tin dilaurate, N-alkyl morpholines, diazabicyclooctane, and the like.

The amount of the catalyst used in the formation of the polyurethanes may vary over a wide range depending upon the nature of the catalyst, the type of reactants. In general the amount of the catalyst will vary from about 1% to about 10% by weight, and more preferably from 3% to 6% by weight.

Foams may be prepared by the so-called "one-shot" method or the "quasi-prepolymer method". In the one-shot method, the ingredients are simultaneously intimately mixed with each other to provide a foam by a one-step process. In accordance with the quasi-prepolymer method, a portion of the polyol compound is reacted in the absence of the catalyst with the polyisocyanate component. To prepare a foam, the remaining portion of the polyol is added and the two components are allowed to react in the presence of catalytic systems such as those discussed above and other appropriate additives. Usually a flexible foam is prepared by the one-shot method whereas rigid foams may be produced by that method or the quasi-prepolymer method. Polyurethane or polyisocyanurate elastomers, coatings, solid polymers, etc. may also be prepared by known techniques.

The polymers prepared with the new catalysts may be used for a wide variety of end-uses. For example, the rigid, flexible, semi-flexible or semi-rigid type of polyurethane or polyisocyanurate foams may be used for thermal insulation and as building materials and the like. As specific examples, the cellular products of the invention can be employed as thermal barriers in the construction of fire walls, in the building of industrial and institutional structures, and as insulating materials for high temperature pipelines and ovens, in supersonic aircraft and also as missile components.

To illustrate the preparation of the new catalysts and their use in the disclosed applications, the following examples are given. It is to be understood, however, that the examples are given only in the way of illustration and are not to be regarded as limiting the invention in any way.

EXAMPLE I

This example illustrates the preparation of a catalyst using diethanolamine and ethylene oxide.

To a 5-gallon reactor kettle was added 5.25 lbs. (0.05 lb mole) diethanolamine, which was stirred at room temperature (25° C.) while 4.05 lb (0.05 lb mole) 37% aqueous formaldehyde was added at a controlled rate over a 15 minute period. After a one hour digestion period at 80° C., the water concentration was 32.7% by weight.

Then 11.0 lb (0.25 lb mole) ethylene oxide was added while controlling the temperature less than 90° C. After a digestion period of one hour at 90° C., the mixture was vented and the water concentration was 5.97%.

The product was stripped in high vacuum, to remove water, oxide and some glycol, down to a pressure of 8-10 mm Hg/90° C. The yield was 17.0 lb of a dark-red, mobile liquid. Analysis of the product indicated:
Hydroxyl no., mg KOH/g—597
Total amine, meg./g—2.83

EXAMPLE II

This example illustrates the preparation of a catalyst using diisopropanolamine and ethylene oxide.

To a 5 gallon kettle was added 4.0 lbs water to which was added 1.7 lb (0.10 lb mole) anhydrous ammonia. The resulting solution was heated to 60°-70° C. while 11.60 lb (0.20 lb mole) propylene oxide was added while keeping the temperature below 80° C. After a one-hour digestion period, 4.1 lbs water was removed to give the colorless product, which was identified as diisopropanolamine.

The above product was cooled to 45° to 50° C. and 8.1 lb (0.10 lb mole) 37% aqueous formaldehyde was added. After a digestion period of one hour at 80° C. the mixture contained 23.1% water by weight.

The above mixture was heated at 80° C. and 13.2 lb (0.30 lb mole) ethylene oxide was added. The mixture was digested to constant pressure at 80° C. and finally stripped in high vacuum to remove excess oxide. The product was a dark-red liquid. Yield was 29.1 lbs. Analysis of the product was:
Hydroxyl No. (mg. KOH/g.)—570
Total amine (meg./g.)—2.65

EXAMPLE III

This example illustrates the preparation of a catalyst from morpholine and ethylene oxide.

To a 1500 ml stirred autoclave was added 315 g. (3.0 moles) morpholine, which was stirred under nitrogen at 50° C. while 243 g. (3.0 moles) 37% g. formaldehyde was added. After the addition the mixture was digested at 80° C. for one hour. The water concentration was then 26.4%.

Then 264 g. (6.0 moles) ethylene oxide was added while keeping the reaction temperature at less than about 80° C. After a digestion period of one hour at 80° C. the water analysis was 13.9%.

The product was finally stripped in high vacuum down to 5-10 mm Hg 180° C. Yield was 500 grams of a dark brown liquid. Analysis was:
Hydroxyl No. (mg. KOH/g.)—564
Total amine (meg./g.)—5.27

EXAMPLE IV

This example illustrates the preparation of a catalyst from 2-amino-2-methyl-1-propanol and ethylene oxide.

To the 1500 ml stirred autoclave was added 267 g. (3.0 mole) 2-amino-2-methyl-1-propanol, which was stirred under a nitrogen purge at 60°-70° C. while 243 g. (3.0 mole) 37% aqueous formaldehyde was added. After a digestion period of one hour at 80° C. the water concentration was 13.6%.

Finally, the above reaction mixture was stripped in high vacuum down to 5 mm Hg/90° C. to give 672 grams of a dark red slightly viscous liquid. Analysis was:
Hydroxyl No. (mg. KOH/g.)—931
Total amine (meg./g.)—4.0

EXAMPLE V

This example illustrates the preparation of a catalyst from N,N-bis(hydroxypropyl)-2-aminoethanol and ethylene oxide.

To a 1500 ml autoclave was added 408 g. (4.0 mole) of N,N-bis(hydroxypropyl)-2-aminoethanol and 324 g. (4.0 moles) 37% aqueous formaldehyde. The mixture was heated to 80°-90° C. and 264 grams (6.0 moles) ethylene oxide was added. After a digestion period of one hour at 90° C. constant pressure was reached and the water concentration was 12.5%.

The product was finally stripped in high vacuum down to 5 mm Hg. 185° C. to give 844 g. of a viscous, dark red liquid. Analysis was:
Hydroxyl No. (mg. KOH/g.)—777
Total amine (meg./g.)—3.29

EXAMPLE VI

To the 5 gallon kettle was added 3.0 lb water. Then 0.85 lb (0.05 lb mole) anhydrous ammonia was added. The resulting solution was heated at 60°-70° C. while 5.8 lb (0.10 lb mole) propylene oxide was added while keeping the temperature below 85° C. The mixture was then digested for one hour.

The above mixture was heated at 45°-50° C. and 3.0 lb (0.10 lb mole) solid paraformaldehyde was added.

The resulting mixture was digested at 80° C. for one hour and the water concentration was 27.4%.

Then 6.6 lb (0.15 lb mole) ethylene oxide was added at 80° C. and then digested for one hour down to minimum pressure. The water analysis was then 14.2%.

After a thorough stripping with high vacuum at 80° C. 15.5 lb of a dark red mobile liquid was obtained. Analysis was:
Hydroxyl No. (mg. KOH/g.)—522
Total amine (meg./g.)—3.06

EXAMPLES VII TO XII

Rigid urethane-modified isocyanurate foams were prepared using the catalysts produced in Examples I to 3, and the formulations shown in Table I. The polyol, catalyst, surfactant (1), blowing agent (2) and fire retardant (3) when needed, were mixed well in small stoppered bottle to give the "B" component. The "A" component consisted of the polyisocyanate, which in all cases was Mondur MR which is a mixture of 50% diphenylmethane diisocyanate and 50% of higher polymers of similar structure, has a 32% NCO content and an equivalent weight of 132.
(1) silicon-glycol copolymer
(2) trifluorochloromethane
(3) trichloroethyl phosphate The physical properties of the resulting rigid foams are shown in Table I. The heat distortion temperatures and the closed cells and K-factors are particularly outstanding and surprising in view of the results obtained with the related compositions of the prior art.

EXAMPLES XIII TO XVIII

The catalysts prepared in Examples 4 to 6 are used to prepare rigid polyurethane foams by the procedure shown in Example VII. The exact formulations employed in the preparation of the foams and the physical properties of the resulting products are shown in Table II. Here again, the heat distortion temperatures and the closed cells and K-factors are particularly outstanding and surprising in view of the results obtained with the related compositions of the prior art.

TABLE NO. 1

| | Ex. 7 | Ex. 8 | Ex. 9 | Ex. 10 | Ex. 11 | Ex. 12 |
|---|---|---|---|---|---|---|
| Formulation, pbw. | | | | | | |
| Polyol Thanol ® TR-380 | 16.0 | — | — | 15.0 | 10.0 | 15.0 |
| Polyol PEG-500 | — | 10.0 | 5.0 | — | — | — |
| Catalyst of Example 1 | 4.0 | — | — | — | — | — |
| Catalyst of Example 2 | — | 5.0 | 5.0 | 5.0 | 5.0 | — |
| Catalyst of Example 3 | — | — | — | — | — | 5.0 |
| Tris(chloroethyl)phosphate | — | — | 5.0 | — | 5.0 | — |
| Silicone DC-193 | 0.5 | 0.5 | 0.5 | 0.5 | 0.5 | 0.5 |
| Freon R-11-B | 12.5 | 12.5 | 12.5 | 12.5 | 12.5 | 12.5 |
| Isocyanate Mondur ® MR | 67.0 | 72.0 | 72.0 | 67.0 | 67.0 | 67.0 |
| Isocyanate Index | 4.5 | 5.8 | 7.5 | 3.8 | 4.8 | 3.8 |
| Butler Chimney Test | | | | | | |
| Flame height, inches | 7 | 6.16 | 4.83 | 7.75 | 3.83 | — |
| Time to extinguish, sec. | 10.8 | 10.83 | 10 | 9.33 | 10.33 | — |
| Percent weight retained | 92.2 | 91.6 | 94.8 | 90.7 | 94.7 | — |
| Foam Appearance | Good | Good | Good | Good | Good | Good |
| Initial Surface Friability | None | None | None | None | None | None |
| Friability (% wt. loss) | 26 | 14.7 | 36.8 | 6.9 | 30.5 | — |
| Reaction Rate | | | | | | |
| Cream time, sec. | 10 | 10 | 11 | 11 | 10 | 5 |
| Tack free time, sec. | 30 | 26 | 28 | 27 | 25 | 12 |
| Rise time, sec. | 65 | 60 | 60 | 55 | 55 | 25 |
| Physical Properties | | | | | | |
| Density, pcf. | 2.11 | 2.01 | 2.01 | 2.03 | 1.97 | — |
| Comp. str., psi. parallel | 36.98 | 36.77 | 35.73 | 39.86 | 35.74 | — |
| perp. | 11.96 | 11.31 | 13.01 | 13.30 | 13.47 | — |
| Heat dist. temp., °C. | >225 | >225 | >225 | 223 | >225 | — |
| Closed cells % | 91.22 | 91.95 | 91.41 | 92.49 | 91.36 | — |
| K-factor | 0.118 | 0.132 | 0.131 | 0.124 | 0.120 | — |
| Dimensional Stability | ΔV ΔW ΔL | ΔV ΔW ΔL | ΔV ΔW ΔL | ΔV ΔW ΔL | ΔV ΔW ΔL | ΔV ΔW ΔL |
| 1 week −20° F. | −10  0 −6 | −11  0 −7 | −9 −5 −4 | 0 −3 −4 | 0 −2 — | |
| 1 week 180° F. | +4 −2 +3 | +3 −3 +2 | +3 −3 +2 | +4 −2 +3 | +3 −3 +2 | — |
| 1 week 158° F., 100% R.H. | +4 −4 +2 | +3 −4 +2 | +3 −4 +2 | +4 −2 +2 | +4 −3 +3 | — |

Polyol Thanol ® TR-380 = an ethylene oxide adduct of aniline (U.S. Pat No. 4,067,833)
Polyol PEG-500 = polyethylene glycol with a molecular weight of 500

TABLE NO. II

| | Ex. 13 | Ex. 14 | Ex. 15 | Ex. 16 | Ex. 17 | Ex. 18 |
|---|---|---|---|---|---|---|
| Formulation, pbw. | | | | | | |
| Polyol Thanol ® TR-380 | — | — | — | 17.0 | — | 11.0 |
| Polyol Thanol ® PEG-500 | 15.0 | 15.0 | 17.0 | — | 11.0 | — |
| Catalyst of Example 4 | 5.0 | — | — | — | — | — |
| Catalyst of Example 5 | — | 5.0 | — | — | — | — |
| Catalyst of Example 6 | — | — | 3.0 | 3.0 | 3.0 | 3.0 |
| Fyrol CEF | — | — | — | — | 6.0 | 6.0 |
| Silicone DC-193 | 0.5 | 0.5 | 0.5 | 0.5 | 0.5 | 0.5 |
| Freon R-11-B | 12.5 | 12.5 | 12.5 | 12.5 | 12.5 | 12.5 |
| Isocyanate Mondur ® MR | 67.0 | 67.0 | 67.0 | 67.0 | 67.0 | 67.0 |
| Isocyanate Index | 4.0 | 4.0 | 5.0 | 4.5 | 7.1 | 5.9 |
| Butler Chimney Test | | | | | | |
| Flame height, inches | — | >11 | 7.67 | 7.83 | 3.92 | 4.08 |
| Time to extinguish, sec. | — | 10 | 13.0 | 11.17 | 10 | 10 |

TABLE NO. II-continued

|  | Ex. 13 | Ex. 14 | | | Ex. 15 | | | Ex. 16 | | | Ex. 17 | | | Ex. 18 | | |
|---|---|---|---|---|---|---|---|---|---|---|---|---|---|---|---|---|
| Percent weight retained | — | 79.6 | | | 88.02 | | | 87.6 | | | 94.0 | | | 93.09 | | |
| Foam Appearance | Good | Good | | | Good | | | Good | | | Good | | | Good | | |
| Initial Surface Friability | None | None | | | None | | | None | | | None | | | None | | |
| Friability (% weight loss) | — | 14.3 | | | 18.6 | | | 18.0 | | | 30.8 | | | 30.7 | | |
| Reaction Rate | | | | | | | | | | | | | | | | |
| Cream time, sec. | 15 | 17 | | | 12 | | | 18 | | | 10 | | | 19 | | |
| Tack free time, sec. | 44 | 32 | | | 25 | | | 36 | | | 28 | | | 32 | | |
| Rise time, sec. | 63 | 60 | | | 50 | | | 70 | | | 55 | | | 70 | | |
| Physical Properties | | | | | | | | | | | | | | | | |
| Density, pcf. | — | 2.06 | | | 2.09 | | | 2.04 | | | 2.13 | | | 2.11 | | |
| Comp. str., psi. parallel | — | 39.24 | | | 37.06 | | | 40.79 | | | 36.63 | | | 38.94 | | |
| perp. | — | 11.07 | | | 11.11 | | | 12.61 | | | 12.54 | | | 14.52 | | |
| Tensile strength, psi. | | | | | | | | | | | | | | | | |
| Heat dist. temp., °C. | — | 223 | | | 219 | | | 218 | | | >225 | | | 222 | | |
| Closed cells % | — | 90.43 | | | 90.32 | | | 90.86 | | | 90.18 | | | 90.56 | | |
| K-factor | — | 0.120 | | | 0.126 | | | 0.124 | | | 0.127 | | | 0.127 | | |
| Dimensional Stability | ΔV ΔW ΔL | ΔV | ΔW | ΔL | ΔV | ΔW | ΔL | ΔV | ΔW | ΔL | ΔV | ΔW | ΔL | ΔV | ΔW | ΔL |
| 1 week −20° F. | — | −6 | 0 | −4 | −6 | 0 | −4 | −5 | 0 | −3 | −4 | 0 | −2 | −3 | 0 | −2 |
| 1 week 180° F. | — | +2 | −3 | +2 | +2 | −4 | +2 | +3 | −2 | +5 | +2 | −4 | +2 | +2 | −3 | +2 |
| 1 week 158° F., 100% R.H. | — | +1 | −6 | +2 | +1 | −6 | +2 | +3 | −4 | +2 | +2 | −6 | +2 | +2 | −4 | +2 |

What is claimed is:

1. A process for preparing catalysts for use in the trimerization of isocyanates and the preparation of urethanes from polyols and isocyanates which comprises reacting an amine with an epoxide of the formula

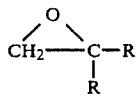

wherein both R's can be hydrogen or an organic radical in the presence of water and an aldehyde of the formula

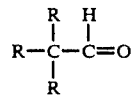

wherein R is an alkyl, cycloalkylaryl or alkaryl radical or two R's are joined to form an aromatic or heterocyclic radical, and then stripping off the water.

2. A process as in claim 1 wherein the amine is a member of the group consisting of aliphatic, cycloaliphatic, heterocyclic and aromatic mono- primary, secondary and tertiary amines.

3. A process as in claim 1 wherein the amine is an alkanolamine.

4. A process as in claim 1 wherein the epoxide is an alkylene oxide.

5. A process as in claim 1 wherein the epoxide is an alkylene oxide of the group consisting of ethylene oxide, propylene oxide, butylene oxide and amylene oxide.

6. A process as in claim 1 wherein the aldehyde is formaldehyde.

7. A process as in claim 1 wherein the epoxide is ethylene oxide.

8. A process as in claim 1 wherein the amine is isopropanolamine.

9. A process as in claim 1 wherein the amine and the aldehyde are combined in a molar ratio varying from 1.5:1 to 1:1.5.

10. A process as in claim 1 wherein the epoxide is employed in amounts varying from 2 to 10 times the weight of the amine.

11. A process for preparing a catalyst for use in polymerizing isocyanates and preparing urethanes from alcohols and isocyanates which comprises heating a mixture of an alkanolamine with formaldehyde, an alkylene oxide and water at a temperature below 90° C., until the complex is formed and then stripping off the water.

12. A process as in claim 1 wherein the reaction is conducted at a temperature below 90° C.

13. A catalyst useful for preparing polymers of isocyanates comprising the reaction product prepared by the process of claim 1.

* * * * *